E. B. STIMPSON.
RIVET.
APPLICATION FILED AUG. 1, 1907.

959,177.

Patented May 24, 1910.

Witnesses:

Edwin Ball Stimpson, Inventor
By his Attorney

UNITED STATES PATENT OFFICE.

EDWIN BALL STIMPSON, OF NEW YORK, N. Y., ASSIGNOR TO EDWIN B. STIMPSON COMPANY, A CORPORATION OF NEW YORK.

RIVET.

959,177.  Specification of Letters Patent.  Patented May 24, 1910.

Application filed August 1, 1907. Serial No. 386,579.

*To all whom it may concern:*

Be it known that I, EDWIN BALL STIMPSON, a citizen of the United States, and a resident of the borough of Brooklyn, city and State of New York, have invented certain new and useful Improvements in Rivets, of which the following is a specification.

My invention relates to an improved rivet of which a specific form is shown in the accompanying drawings wherein—

Figure 1:
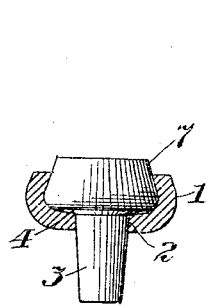
Figure 2:
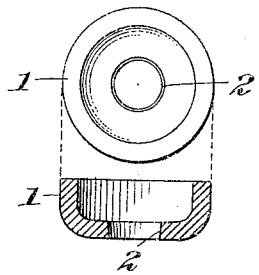
Figure 3:
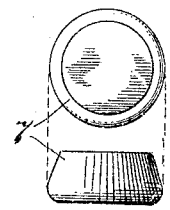
Figure 4:
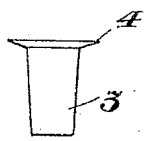
Figure 5:
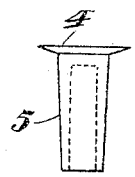
Figure 6:
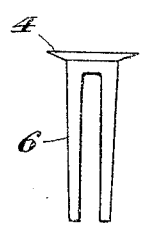

Figure 1. is a side-elevation partly in section of the parts of my rivet assembled; Fig. 2. is a combined top plan and vertical mid-sectional view of the cup member of the rivet; Fig. 3. is a combined top plan and side elevation view of the head-piece of the rivet; Figs. 4, 5 and 6 are side elevations respectively of various forms of shank-members, that in Fig. 4 being solid, in Fig. 5 hollow, and in Fig. 6 bifurcated.

The complete rivet shown in Fig. 1. consists of three members, the cup-member shown in Fig. 2, the head-piece in Fig. 3, and the shank-member in Fig. 4.

The cup-member is designated 1 and is perforated with a preferably round hole 2, through its bottom. Said hole also preferably tapers as shown in Fig. 2.

The shank-member of Fig. 4, which is the one shown in Fig. 1, comprises a shank 3 preferably tapered as shown, and a head 4. The shank 3, inserted through the aforesaid hole in the bottom of the cup with its head 4 retained therein, constitutes the shank of the finished rivet; see Fig. 1.

Figs. 5 and 6 show other forms of shank members, that in Fig. 5 having a hollow shank 5 and that of Fig. 6 a bifurcated shank 6. Both of these forms of shank-members have heads 4 like the solid shank-member of Fig. 4 and both are adapted to be used interchangeably with the solid form in connection with the cup 1 and head-piece 7 (Fig. 3) next to be described. This head-piece 7 is of a size to be received within cup 1, and is permanently retained therein by having the sides of the cup in Fig. 2 squeezed about it as shown in Fig. 1. The head piece preferably broadens out toward its base to make its connection with the cup the more secure. Again the taper of the head-piece permits the rivet to be worn down entirely through the head-piece until there is nothing left of it, without possibility of its separating from the cup at any of the stages of wear. Likewise the cup 1, cannot separate from the shank through any stages of wear for a similar reason, viz. on account of the taper connection previously alluded to between these parts.

The advantages of the head-piece 7 in combination with the other parts are numerous. Thus it provides a simple means of securing the cup and shank members together. This facilitates the operation of clenching the rivets to a tire or other object, because during that operation it prevents return of the shank back into the cup, a frequent and annoying occurrence when the rivets consist merely of the cup and shank members without the head-piece 7 to prevent the return of the shank into the cup as shown in Fig. 1. In other words, in the herein rivet the bottom of the head-piece 7 acts as an anvil against which the shank can abut in the operation of riveting its free end.

To overcome the described separation of cup and shank members during riveting, recourse has been had by some to burring the shank of the rivet immediately below the bottom of the cup by a suitable machine operation, to form a projecting bur or flange on the shank sufficient to prevent its return into the cup during riveting. While this is a remedy, it lacks the advantage of universality. Thus it is applicable only to rivets in which the shank is such that it will not be destroyed or injured, when gripped and squeezed as it must be, in the machine-operation required to produce the aforesaid bur or flange. Practically speaking this means that only solid shank-members can be burred. The hollow or bifurcated (Figs. 5 and 6) and other delicate forms cannot. Therefore it is seen that the burring method is far from universal. It is here that the head-piece in the three-part combination of my present rivet demonstrates its superiority. It is obviously adapted to inseparably unite the cup and shank members irrespective of the form or delicate nature of the shanks. In other words it has the always great advantage of universality.

A further advantage of my present invention, important because of its universal nature, is that a ready means is provided for forming rivets of every possible kind, with heads and shanks of any relative size, shape, character or conformation whatsoever. Thus the head-piece can be exceedingly large relative to the shank or vice-versa. It may carry spikes, corrugations or otherwise. The shanks may be as slight or as delicate as desired, and of any and every variety. Moreover the same variety exists as to materials except that they must be consistent with the nature of the article, which is a rivet. In other words, the head-piece 7 for example, must be made of material of such inherent strength that it will not break from the end-thrust of the shank when the free end of the latter is clenched or riveted.

The rivet shown complete in Fig. 1 is adapted to protect the tires of automobiles and the like, and to prevent slipping and skidding thereof. In it the shank will be made of a soft or clenching steel, the cup or base member 1 of either the same or of hardened steel, while the head-piece 1 will consist of hardened steel. To especially adapt it to take hold of the road, this head-piece, best shown in Fig. 3, is cupped out or recessed on its road-contacting face to give a projecting cup-like wall, the hard edges of which are especially effective to prevent slipping and skidding. The head-piece 7 is not cupped out clear through its bottom, since it is the bottom of said head-piece that forms the anvil against which the shank 3 bears during riveting, and which otherwise holds said shank in place.

It is obvious that the head-piece 7 receives the wear due to contact with the road and for this reason it may be called a wearing block and has been so designated in the claim.

Having thus described my invention, what I claim is:—

A rivet comprising a shank, a head cup, a flange on the shank within the cup, and a wearing block secured within the cup and clamping the flange against the bottom of the cup, substantially as described.

In witness whereof, I have signed my name to the foregoing specification in the presence of two subscribing witnesses.

EDWIN BALL STIMPSON.

Witnesses:
E. W. Scherr, Jr.,
H. R. Bauer.